(12) United States Patent
Sinquin et al.

(10) Patent No.: US 6,425,098 B1
(45) Date of Patent: Jul. 23, 2002

(54) PREVENTION OF DISK PIRACY

(75) Inventors: Patrice Sinquin; Philippe Selve; Ran Alcalay, all of Tel Aviv (IL)

(73) Assignee: Midbar Tech (1998) Ltd., Tel Aviv (IL)

( * ) Notice: Subject to any disclaimer, the term of this patent is extended or adjusted under 35 U.S.C. 154(b) by 0 days.

(21) Appl. No.: 09/370,813

(22) Filed: Aug. 9, 1999

Related U.S. Application Data

(63) Continuation-in-part of application No. 09/175,255, filed on Oct. 20, 1998, now Pat. No. 6,256,738.

(51) Int. Cl.⁷ .............................. G11B 20/00; G06F 1/00
(52) U.S. Cl. ..................... 714/699; 705/57; 713/193; 369/53.21
(58) Field of Search ................. 380/201, 202; 705/57, 58; 713/193; 714/699

(56) References Cited

U.S. PATENT DOCUMENTS

| 5,699,434 A | * 12/1997 | Hogan ........................ 380/49 |
| 5,930,209 A | 7/1999 | Spitzenberger et al. .. 369/47.12 |
| 6,104,679 A | 8/2000 | Sollish .................... 369/53.21 |

FOREIGN PATENT DOCUMENTS

| WO | 98/08180 | * 2/1998 |
| WO | 9852194 | 11/1998 |
| WO | 9854713 | 12/1998 |

OTHER PUBLICATIONS

Voelcker, et al., How disks are 'padlocked'; IEEE Spectrum, Jun. 1986, pp. 32–40.*
"CD.–ROM and Its Technology." No. 36, pp 559–600.
"Information Technology–Data Interchange on Read–Only 120 MM Optical Data Disks (CD–ROM)." International Standard, ISO/IEC 10149, Second Edition, (1995), title page only.
Standard 908 of the IEC, entitled "Compact Disc Digital Audio System", Geneva, Switzerland, 1987.
"The CD Family", Published by Philips Consumer Electronics B.V. (Eindhoven, The Netherlands). Mar. 1996.
SAA7345, CMOS Digital Decoding IC with RAM for Compact Disc, Published by Philips Semiconductors, Feb. 16, 1998.

* cited by examiner

Primary Examiner—David L. Robertson
(74) Attorney, Agent, or Firm—Ladas & Parry

(57) ABSTRACT

A method for protecting data recorded on an original data storage medium against unauthorized copying includes receiving data encoded in accordance with an applicable recording standard, and altering a portion of the encoded data such that the altered data are identified as erroneous according to the standard. The data are recorded on the medium, together with ancillary data which are used by a processor in an intended application of the medium to operate upon the altered portion of the data such that the application runs in a manner substantially unaffected by the alteration of the data. Upon unauthorized copying of the data, however, the ancillary data are ineffective in correcting the altered portion of the encoded data, so that the alteration causes a substantially unrecoverable error in an unauthorized copy of the original medium.

9 Claims, 9 Drawing Sheets

PREVENTION OF DISK PIRACY

CROSS-REFERENCE TO RELATED APPLICATIONS

This application is a continuation-in-part of U.S. patent application Ser. No. 09/175,255, filed Oct. 20, 1998, entitled "CLV Carrier Copy Protection System," which is assigned to the assignee of the present patent application and incorporated herein by reference now U.S. Pat. No. 6,256,738.

FIELD OF THE INVENTION

The present invention relates generally to protection of intellectual property rights, and specifically to prevention of unauthorized copying of recorded, computer-readable media.

BACKGROUND OF THE INVENTION

Compact disk (CD) recordings are a preferred means for distributing both digital audio recordings and computer software. CD audio recordings are almost universally made in accordance with standard 908 of the International Electrotechnical Commission (IEC), entitled "Compact Disc Digital Audio System" (Geneva, Switzerland, 1987), which is incorporated herein by reference. The 908 standard defines how audio data are to be encoded and recorded on the disk, enabling the data to be played back using standard digital decoding chips. Different standards apply to other types of data, such as computer software and video, which may be recorded on CD, as well. The various types of CDs and standards for CD recording and data storage are described, for example, in a booklet entitled "The CD Family," published by Philips Consumer Electronics B.V. (Eindhoven, Netherlands), which is incorporated herein by reference. A "road map" shown on page 29 of the booklet lists different formats that exist among members of the "CD family."

FIG. 1 is a block diagram illustrating the structure of a frame 20 of audio data for storage on an audio CD, in accordance with the IEC 908 standard. Each such frame comprises one control symbol 24, followed by thirty-two data symbols 28. Each symbol is spaced from the preceding one by a separator 30 comprising three auxiliary bits. A block of data on the CD comprises ninety-eight frames, each of which is separated from the preceding frame by a twenty-four-bit synchronization pattern 22.

Each symbol 28 recorded on the CD in frame 20 comprises fourteen channel bits, which correspond to a single byte of binary input data. Each of the 256 possible byte values is encoded in a process of eight-to-fourteen bit modulation (known as "EFM" modulation) as a fourteen-bit code, specified in the IEC 908 standard. A characteristic of the EFM codes is that over a run of coded data of a specified maximum length $T_{max}$, including successive symbols 28 and separators 30, there will always be at least one transition (from zero to one or from one to zero). $T_{max}$ is specified by the standard to be 11 channel bits long. When the data are read out from the CD, any absence of such a transition over the course of 12 successive bits will be noted as a medium error.

Following control symbol 24, each frame 20 comprises two data segments 26 and 34 and two error correction segments 32 and 36. Each data segment comprises twelve symbols, containing data and parity information, typically corresponding to digitized audio data. Error corrections segments 32 and 36 each comprise four symbols, which are calculated based on the data in segments 26 and 34 using a Cross Interleave Reed Solomon Code (CIRC), as specified by the 908 standard. The CIRC segments are read during playback and are used to identify errors in the corresponding data segments. Dedicated, proprietary processors, typically based on custom integrated circuit chips, are used in CD players to correct the errors if possible and to conceal those errors that cannot be corrected, as described further hereinbelow.

FIG. 2 is a schematic block diagram illustrating the functions of an integrated circuit (IC) processor 40 used for digital processing of data read from a CD, as is known in the art. The functional blocks shown in FIG. 2 are typical of commercially-available ICs, such as the SAA7345 and SAA7348 devices produced by Philips Semiconductors (Eindhoven, The Netherlands), which are used in common audio CD players.

Data are read from the CD by an optical reading head (not shown) and are input to a phase locked loop (PLL) 42 for synchronization purposes. Fourteen-bit data segments 28 are converted to eight-bit symbols by an EFM demodulator 44 and are then stored by a first-in-first-out (FIFO) memory 46. An error corrector 48 compares the audio data read from data segments 26 and 34 to the corresponding CIRC data in segments 32 and 36. If an error is found, corrector 48 attempts to correct the data, using the CIRC information. Such correction is not always possible, however. Corrector 48 sets indicator flags 50 depending on whether an error was detected and whether it could be corrected.

Data from error corrector 48 is input to a digital audio processing circuit 52. If flags 50 indicate that there was an uncorrectable error in the data, an interpolator 54 conceals the erroneous value either by holding a preceding data value or by interpolating between adjacent values. The erroneous value itself is discarded. A filter 56 processes the data to enhance audio quality, and a data interface 58 formats the data for conversion to analog form by a digital/analog converter (DAC) 59. Although some processing circuits can provide a digital output of the "raw" data, without error correction or concealment, special equipment is required to deal with this digital output, and such equipment is generally available only to established recording studios.

Original CDs are produced by stamping plastic blanks with a master mold piece, which is produced using costly, specialized equipment. Because of the high cost of CD recording equipment, CD recordings were considered, until recently, to be relatively secure against unauthorized copying. This situation has changed recently, as inexpensive CD recording devices and read/write media have become available to consumers. Thus, it is now easy, using a conventional personal computer with a read/write CD drive, or with one read drive and one write drive, to make exact, digital copies of all types of CDs. The CD content is read out by the computer, byte by byte, from one CD, typically a legitimately-purchased original CD, and then written to a blank CD so as to make a pirate copy. Similar copying methods may be used with other media, such as DVD (Digital Video Disks, also known as Digital Versatile Disks). Financial losses to the recording and software industries due to such pirate copying are estimated to be in the billions of dollars.

SUMMARY OF THE INVENTION

It is an object of the present invention to provide improved methods and apparatus for preventing unauthorized copying of recorded, computer-readable media.

It is a further object of some aspects of the present invention to provide methods and apparatus for producing compact disks that are resistant to unauthorized copying.

It is yet another object of some aspects of the present invention to provide methods and apparatus for preventing unauthorized digital copying of audio disks.

It is still a further object of some aspects of the present invention to provide methods and apparatus to preventing unauthorized copying of software disks.

In preferred embodiments of the present invention, errors are intentionally introduced into the coded content of an original digitally-recorded medium. The content of the medium further includes ancillary data, such as error detection codes or a program routine, that enable a processor in a conventional playback device, reading the original medium in accordance with a given recording standard, to automatically overcome the errors. Typically the ancillary data enable the processor either to correct or conceal the errors during playback or to ignore them altogether. When an unauthorized copy is made of the medium, however, the ancillary data are ineffective in overcoming the intentional errors in the original medium, with the result that faults occur in the copy that are substantially unrecoverable. In other words, the present invention takes advantage of error-avoidance features of the recording standard in an unexpected way, using recoverable errors introduced in the original medium to cause more serious, unrecoverable faults to be generated in the copy.

Preferred embodiments of the present invention are described hereinbelow with reference to digital compact disks (CDs) and the IEC 908 standard, which applies to audio CDs. It will be appreciated, however, that the principles of the present invention may likewise be applied to other digital recording media and standards, which like audio CDs, employ techniques of encoding and error correction that can be exploited using methods similar to those described herein. The various members of the CD family, such as CD-ROM, DVD and other formats listed in the above-mentioned "CD Family" booklet, are particularly suited for application of such methods.

In some preferred embodiments of the present invention, the errors in the data are introduced after the data have been encoded in the form of a modulated data stream for driving a recording device, such as a laser beam recorder used in producing a CD master. An error generator produces a modified modulated data stream, including the intentional errors, and the modified data stream is used to drive the recording device. Such an error generator is advantageous in that it allows the present invention to be implemented in a recording facility with only minimal modification to existing infrastructure and equipment. Alternatively, the functionality of the present invention may be implemented in equipment that is used to perform other data encoding and modulation functions connected with recording on the medium, without separate, dedicated hardware for this purpose.

In some preferred embodiments of the present invention, applicable particularly to audio and video recordings, the medium contains segments of recorded data, which are interspersed with error detection codes, or error correcting codes, as are known in the art. Ordinarily, when a segment of recorded data is read out from the medium, and the corresponding code indicates that an uncorrectable error is present in the segment, the erroneous data are concealed by interpolation between neighboring data values, as described in the Background of the Invention, for example. During recording of the original medium, errors are introduced in certain data segments, without providing error detection codes capable of correcting such segments. Preferably the segments chosen for this purpose are those with respect to which it is determined that the normal error concealment mechanism on playback will not cause a noticeable effect in sound quality. Thus, the intentionally-introduced errors in the original medium are substantially concealed when the medium is played back.

When an unauthorized copy of the medium is made, the data segments are read out and recorded in the copy, including the intentionally-introduced errors. The equipment used to make the copy, which typically comprises a personal computer with an optical recording drive, computes new error detection codes to be recorded with the data segments on the copy. The new codes are based on the recorded data, including the intentionally-introduced errors. Therefore, when the copied medium is played back, the errors are not detected as such, and thus are not concealed by the playback equipment. The audio quality of the output is, as a consequence, unacceptably and irreparably compromised.

In other preferred embodiments of the present invention, applicable particularly to digital data recordings, an error is introduced into a selected data frame in the original medium, so as to render the frame unreadable by a standard playback device. Preferably, the error is introduced by creating a run of coded data that violates a convention imposed by an applicable recording standard, for example, a run of data bits in which no transition occurs over a duration greater than a maximum duration imposed by the standard (such as $T_{max}$ according to the IEC 908 standard). The original medium also includes or is otherwise associated with a program routine, which specifies to the playback device the locations of audio or other data blocks recorded in the medium. The device is able to skip over and ignore the erroneous frame, so that a user of the device is unaware of the error.

When an unauthorized copy is made of the medium, however, the equipment used to read out the data from the original medium will be unable to decode the erroneous frame and will therefore be unable to copy it. Instead, in recording the copy, the equipment will typically skip over the frame or block containing the error. Consequently, the data blocks following the skipped frame or block will be copied to the unauthorized copy in locations that are shifted relative to their locations in the original medium. When the program routine associated with the medium is run, in order to play back the unauthorized copy, the audio or other data blocks will not be found at the proper locations specified by the routine. The unauthorized copy is thus rendered unusable.

Alternatively, it may occur that instead of skipping the frame or block, the equipment will insert a frame or block with substitute data. Preferably, to deal with this eventuality, the program routine associated with the medium checks the data contained in the frame or block that is supposed to contain the error. If the substitute data are present instead of the expected data, the program routine will not allow the copy to be used.

In one of these preferred embodiments, the original medium comprises a disk containing computer software, recorded thereon in the form of computer-readable program files. In addition to the program files, the disk includes an audio track, in which an erroneous frame has been introduced as described above, preferably by creating a segment that has no transitions over a duration greater than $T_{max}$, as specified by the IEC 908 standard. One or more of the program files include instructions such that when the corresponding programs are run on a computer, the computer attempts to read certain data recorded at specified locations in the audio track. When the original disk is used, the computer finds the proper data at the specified locations. When an unauthorized copy of the disk is used, however, the data in the audio track are shifted and cannot be found at their specified locations. The program ceases to run as a result.

There is therefore provided, in accordance with a preferred embodiment of the present invention, a method for protecting data recorded on an original data storage medium against unauthorized copying, including:

receiving data encoded in accordance with an applicable recording standard;

altering a portion of the encoded data such that the altered data are identified as erroneous according to the standard; and recording the data on the medium, the recorded data including ancillary data which are used by a processor in an intended application of the medium to operate upon the altered portion of the data such that the application runs in a manner substantially unaffected by the alteration of the data, but which ancillary data are ineffective in correcting the altered portion of the encoded data upon copying of the data, so that the alteration causes a substantially unrecoverable error in an unauthorized copy of the original medium.

Preferably, the medium includes a compact disk or, alternatively, a digital video disk.

Further preferably, the data include digital audio data, wherein the applicable recording standard includes standard 908 of the International Electrotechnical Commission. In a preferred embodiment, altering the portion of the encoded data includes introducing an error in a subcode Q channel to be recorded on the medium, preferably by specifying in a table of contents of the medium an erroneous value of the start time of a leadout of a track of the data to be recorded on the medium.

Additionally or alternatively, the data include computer program instructions.

In a preferred embodiment, the ancillary data include error detection codes, and altering the portion of the data includes changing a data value without changing a corresponding error detection code, such that the value is identified as erroneous using the corresponding code. Preferably, in accordance with the standard, the error detection code is recalculated upon copying of the data, so that the altered portion is no longer identified as erroneous.

Preferably, in the intended application using the original medium, the alteration of the portion of the data is concealed by interpolation based on the corresponding error detection code, wherein altering the data includes selecting a portion of the data for alteration so as to minimize the effect on the application of substituting an interpolated value of the data for a received value thereof.

Further preferably, changing the data value includes changing the value of a digital audio signal, such that when the ancillary data are not used to operate upon the altered portion, the quality of an audio output signal generated responsive to the data is noticeably degraded.

In another preferred embodiment, altering the portion of the data includes generating altered data for recording on the medium such that when the altered data are scanned by a reading device, the device identifies the alteration as a fault in the medium. Preferably, generating the altered data includes producing an extended run of consecutive data in which there is no transition between permitted levels of the data.

Preferably, generating the altered data includes introducing an alteration in a data block such that when the medium is copied, the data block is dropped from the copied medium, wherein introducing the alteration in the data block includes producing an alteration in a block containing information that is required by the processor in the course of running the application.

Alternatively or additionally, introducing the alteration in the data block includes producing an alteration in a first block which is followed in a sequence of blocks to be recorded on the medium by a second block containing information that is required by the processor in the course of running the application, such that when the medium is copied and the first data block is dropped, the second block is recorded on the copied medium in a location different from its location on the original medium.

Preferably, the application includes a computer software application, and wherein recording the data includes recording data including the altered portion in an audio track on the medium.

Preferably, receiving the data includes receiving a stream of modulated data configured for driving a recording device used in a process of recording the data on the medium, and recording the data includes outputting the data to the recording device following alteration of the data. Most preferably, the recording device includes a laser beam recorder used in generating a master for stamping the original medium.

There is also provided, in accordance with a preferred embodiment of the present invention, apparatus for protecting data recorded on an original data storage medium against unauthorized copying, including an error generator, which receives data encoded in accordance with an applicable recording standard and alters a portion of the encoded data prior to recording of the data on the medium such that the altered data are identified as erroneous according to the standard, wherein the data recorded on the medium include ancillary data, which are used by a processor in an intended application of the medium to operate upon the altered portion of the data such that the application runs in a manner substantially unaffected by the alteration of the data, but which ancillary data are ineffective in correcting the altered portion of the encoded data upon copying of the data, so that the alteration causes a substantially unrecoverable error in an unauthorized copy of the original medium.

There is further provided, in accordance with a preferred embodiment of the present invention, apparatus for protecting data recorded on an original data storage medium against unauthorized copying, including an error generator, which receives a stream of modulated data in a format for driving a recording device used in a process of recording the data on the medium in accordance with an applicable recording standard, and which alters a portion of the encoded data prior to recording of the data on the medium and outputs the data including the altered portion to the recording device, modulated in the format in accordance with the standard.

Preferably, the recording device includes a laser beam recorder used in generating a master for stamping the original medium.

Further preferably, the applicable recording standard includes standard 908 of the International Electrotechnical Commission, wherein the stream of modulated data includes eight-to-fourteen bit modulated (EFM) data.

There is additionally provided, in accordance with a preferred embodiment of the present invention, data storage medium that is resistant to unauthorized copying, on which medium data encoded in accordance with an applicable recording standard are stored, a portion of which encoded data is altered such that the altered data are identified as erroneous according to the standard, the stored data including ancillary data which are used by a processor in an intended application of the medium to operate upon the altered portion of the data such that the application runs in a manner substantially unaffected by the alteration of the data, but which ancillary data are ineffective in correcting the altered portion of the encoded data upon copying of the data from the medium, so that the alteration causes a substantially unrecoverable error in an unauthorized copy of the medium.

Preferably, the medium includes a compact disk including digital audio data, in accordance with standard 908 of the International Electrotechnical Commission. Alternatively, the medium includes a digital video disk. Additionally or alternatively, the data include computer program instructions.

The present invention will be more fully understood from the following detailed description of the preferred embodiments thereof, taken together with the drawings in which:

DETAILED DESCRIPTION OF PREFERRED EMBODIMENTS

Figure 2:
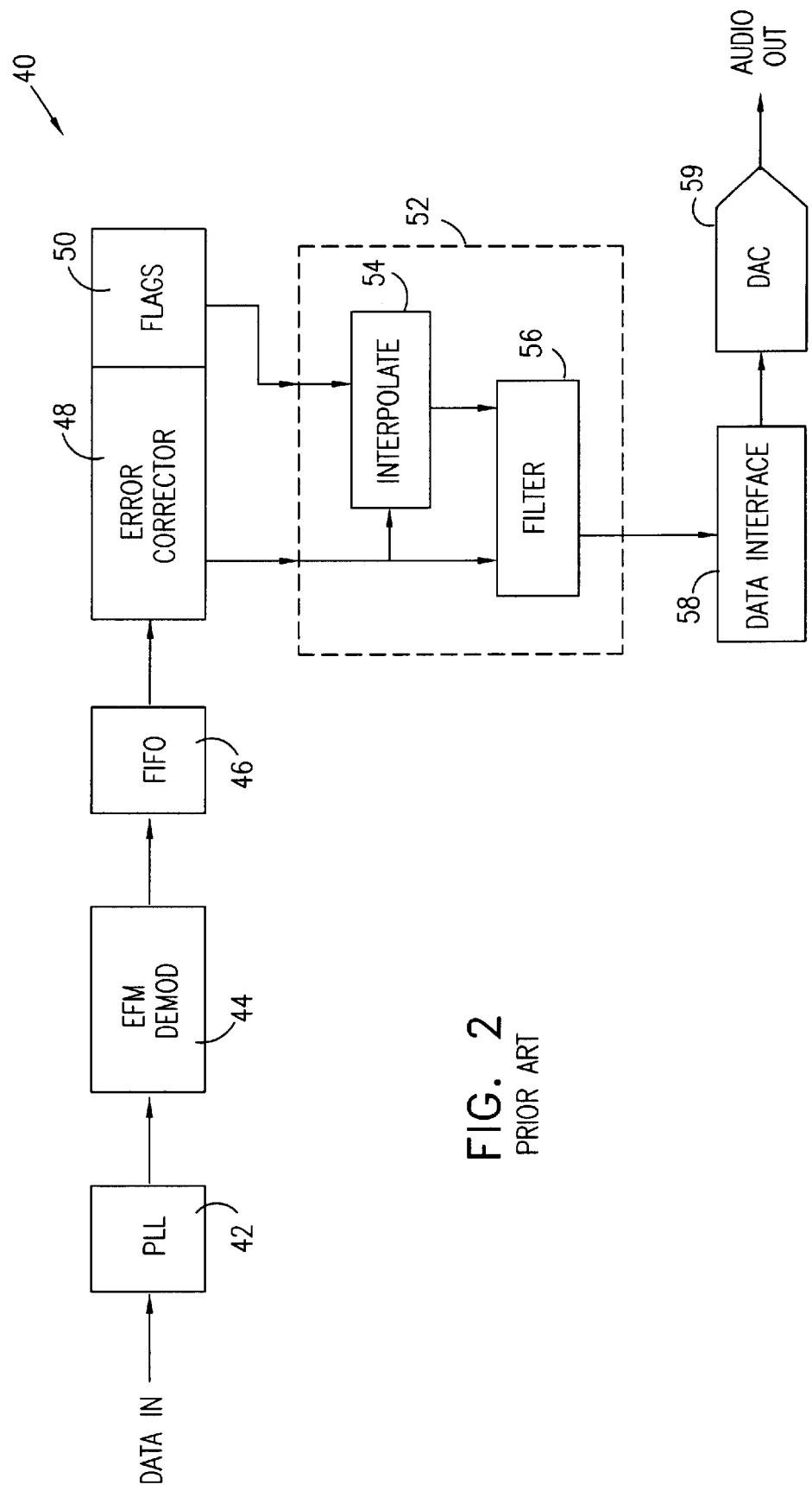
FIG. 2 is a schematic block diagram illustrating processing circuitry used in audio CD playback, as is known in the art.
Figure 3:
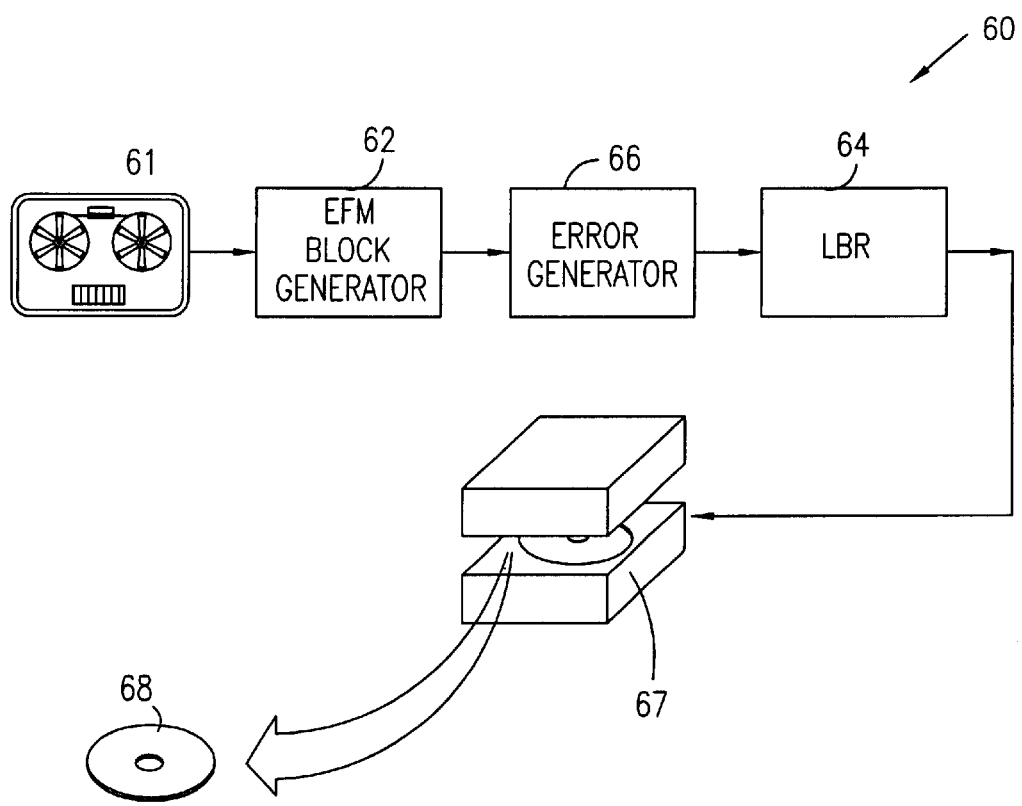
FIG. 3 is a schematic block diagram illustrating apparatus for producing a copy-resistant CD, in accordance with a preferred embodiment of the present invention.

Reference is now made to FIG. 3, which is a block diagram that schematically illustrates apparatus 60 used for producing an original audio compact disk (CD) 68 that is resistant to unauthorized copying, in accordance with a preferred embodiment of the present invention. Reference will also be made in the description that follows to FIGS. 1 and 2, described hereinabove. Apparatus 60 is used to produce a CD master mold 67 from a digital audio master recording 61. The CD master is then used in stamping CD 68, based on manufacturing methods well known in the art. Alternatively, disk 68 may represent a digital video disk (DVD), which is typically produced in like manner.

Figure 1:
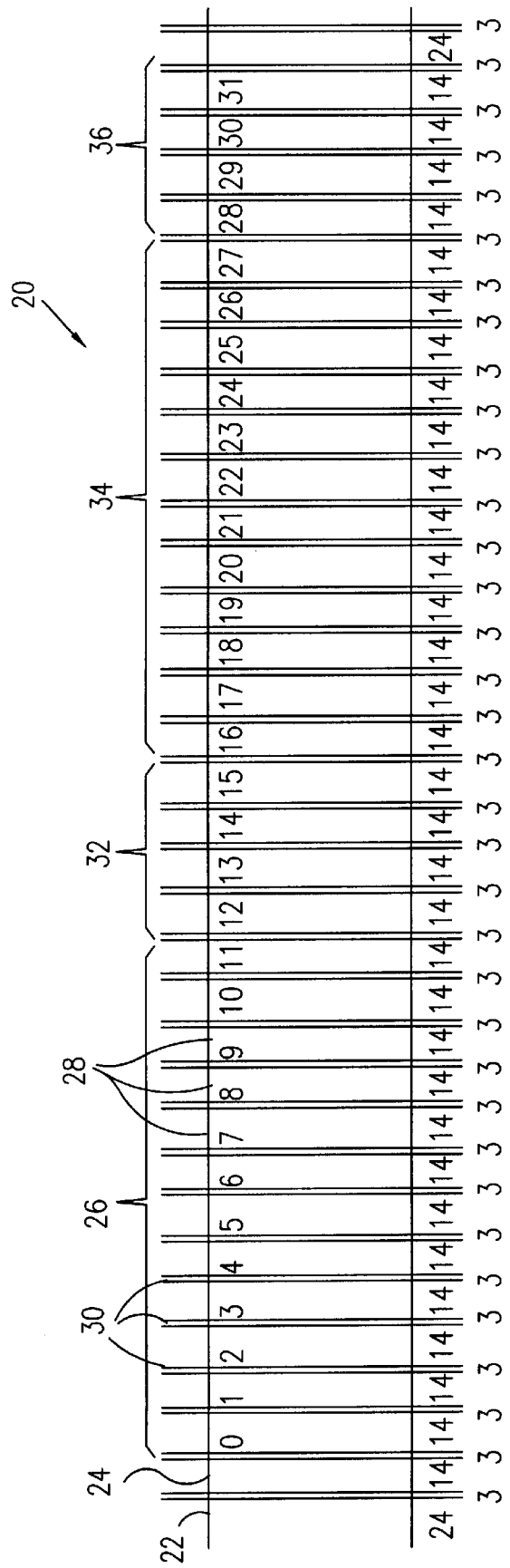
FIG. 1 is a block diagram that schematically illustrates a data frame recorded on a compact disk (CD), in accordance with a recording standard known in the art.

Audio input from recording 61 to apparatus 60 is processed by an EFM block generator 62, as is known in the art, which converts eight-bit digital audio data into a modulated stream of fourteen-bit EFM symbols, in which the symbols are formatted in blocks and frames for CD recording, preferably as specified by the IEC 908 standard. If the data input to block generator 62 does not already include appropriate error correcting codes, such as CIRC data, such codes may also be computed by generator 62 and interleaved with the audio data, preferably as dictated by the 908 standard and shown in frame 20 (FIG. 1). The EFM data stream is passed to an error generator 66, which alters certain of the data segments, such as segment 26 or 34, without changing the corresponding CIRC values in segments 32 and 36. A method and rationale for making such alterations are described hereinbelow. The data from error generator 66 are passed to a laser beam recorder (LBR) 64, which writes the data to CD master 67, as is known in the art.

Apparatus 60 is thus substantially similar to CD mastering equipment known in the art. The essential difference in apparatus 60 is that the bit stream that would normally pass directly from EFM generator 62 to LBR 64 is intercepted and operated upon by error generator 66. Such embodiments of the present invention are thus advantageous in that they require only minimal changes to CD mastering equipment that may already be present in a CD manufacturing plant. Error generator 66 is preferably implemented in dedicated hardware and operates on the bit stream in real time. Alternatively, at least some elements of the error generator are implemented in software on a suitable computer, not necessarily in real time. Further alternatively or additionally, error generator 66 need not be a separate unit, and some or all of its functions may be incorporated into the EFM generator or LBR.

In one such embodiment of the present invention, error generator 66 comprises a field-programmable gate array (FPGA), which receives and decodes the EFM codes from EFM generator 62 and conveys them to a personal computer (PC) for storage and processing. The PC alters certain of the data segments, in order to introduce errors in the data, as described in greater detail hereinbelow, and then returns the data to the FPGA for output in the form of modified EEM codes to LBR 64. The data are conveyed between the FPGA and the PC in the form of 16-bit words, wherein the low byte of each word contains the actual, decoded CD data, and the high byte is a control byte used to flag the data. Preferably, in data sent from the FPGA to the PC, the data are flagged as follows:

Bits 8–10 contain a write-sequence number, needed for calibration if a read/write CD drive (CDR) is used to produce CD 68 (but not needed otherwise).

Bits 11 and 12 are set to zero.

Bits 13–15 are used to mark particular types of data segments used in the IEC 908 standard, such as the Sync0 and Sync1 segments that appear in the first two frames of each data block, and the control byte (CB) and data that appear in the remaining frames.

In the processed data sent back from the PC to the FPGA, bits 8–10 and 13–15 are typically not used. Bits 11 and 12 are preferably set to instruct the FPGA to create a run of data bits in which no transition occurs over a duration greater than $T_{max}$, according to the IEC 908 standard, as described further hereinbelow. When bit 11 is set to 1, the FPGA produces a frame having a 14T pit length without transition. When bit 12 is set to 1, the FPGA is prevented from introducing a transition in merging bits (separator 30—FIG. 1) between two successive symbols 28.

Preferably, a user interface is provided by the PC, enabling a user of error generator 66 to determine how and at what points the content of the CD is to be corrupted for the purposes of copy prevention. The entire EFM content of the CD is read by the FPGA and stored as 16-bit words, preferably on a disk of the PC. The user interface then displays the table of contents (TOC), and the user is given the opportunity to select options independently for each track, such as:

Data type (audio, digital data or broadcast).

Copy protection on/off.

Copy protection method.

Copy protection parameters.

Time flow for each track (regular, constant or backward, as is known in the CD art).

Once the error generation operation on the PC is completed, the stored content is sent back to the FPGA for writing to LBR 64. If necessary, the TOC is recomputed. As noted above, even though some of the data segments are altered for purposes of error generation, the corresponding CIRC codes are unchanged.

Figure 4:
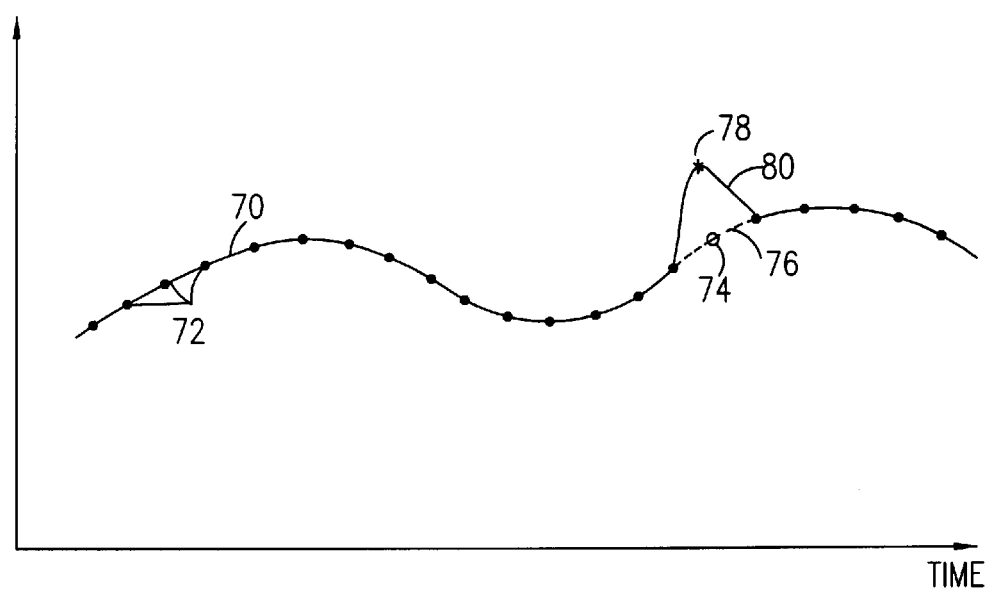
FIG. 4 is a graph that schematically illustrates a sequence of samples of audio data recorded on a CD using the apparatus of FIG. 3, in accordance with a preferred embodiment of the present invention.

FIG. 4 is a graph that illustrates samples 72 of audio data output by error generator 66 and recorded ultimately on CD 68, in which an erroneous data value 78 has been intentionally introduced. Reference is also made at this point to details of processor 40 shown in FIG. 2, and particularly to the aspects of the processor circuit that are involved in error correction and error concealment, as described hereinabove.

Samples 72 in FIG. 4 may be taken to illustrate, by way of example, the amplitude of a given frequency component of an audio signal 70 to be recorded on CD 68. (In reality, the relationship of the audio signals to the data recorded on the CD is far more complex, but the simplified illustration of FIG. 4 is useful in understanding certain aspects of the present invention.) Erroneous data value 78 is recorded on the CD, in place of a correct sample 74, as the result of the operation of error generator 62 (FIG. 3). When value 78 is input to error corrector 48 (FIG. 2), it is compared to the corresponding error code, read from CD 68 at the same time. Assuming that the error is so severe that corrector 48 cannot rectify it, interpolator 54 is actuated to conceal the error, and to output an interpolated value 74 in place of sample 78. When signal 70 is played back, a smooth segment 76 is generated, using value 74, rather than an erroneous segment 80 that would be generated in the absence of error concealment.

Thus, it is possible to introduce intentional errors, such as that represented by value 78, into the audio data recorded on CD 68. As long as the error correcting codes, such as CIRC data contained in segments 32 and 36 of frame 20 (FIG. 1), can be used to detect the error, standard error concealment methods, implemented in processor 40, will prevent the errors from having a noticeable effect on the audio output signal. This is particularly true if the erroneous data values are introduced in portions of the audio signal that happen to be smoothly varying, since in such a case the low-pass effect of the concealment will be least noticeable. In an unauthorized copy of the CD, however, the error correcting codes will be altered, as described hereinbelow, so that the audio output will instead have the distorted form of erroneous segment 80.

Figure 5:
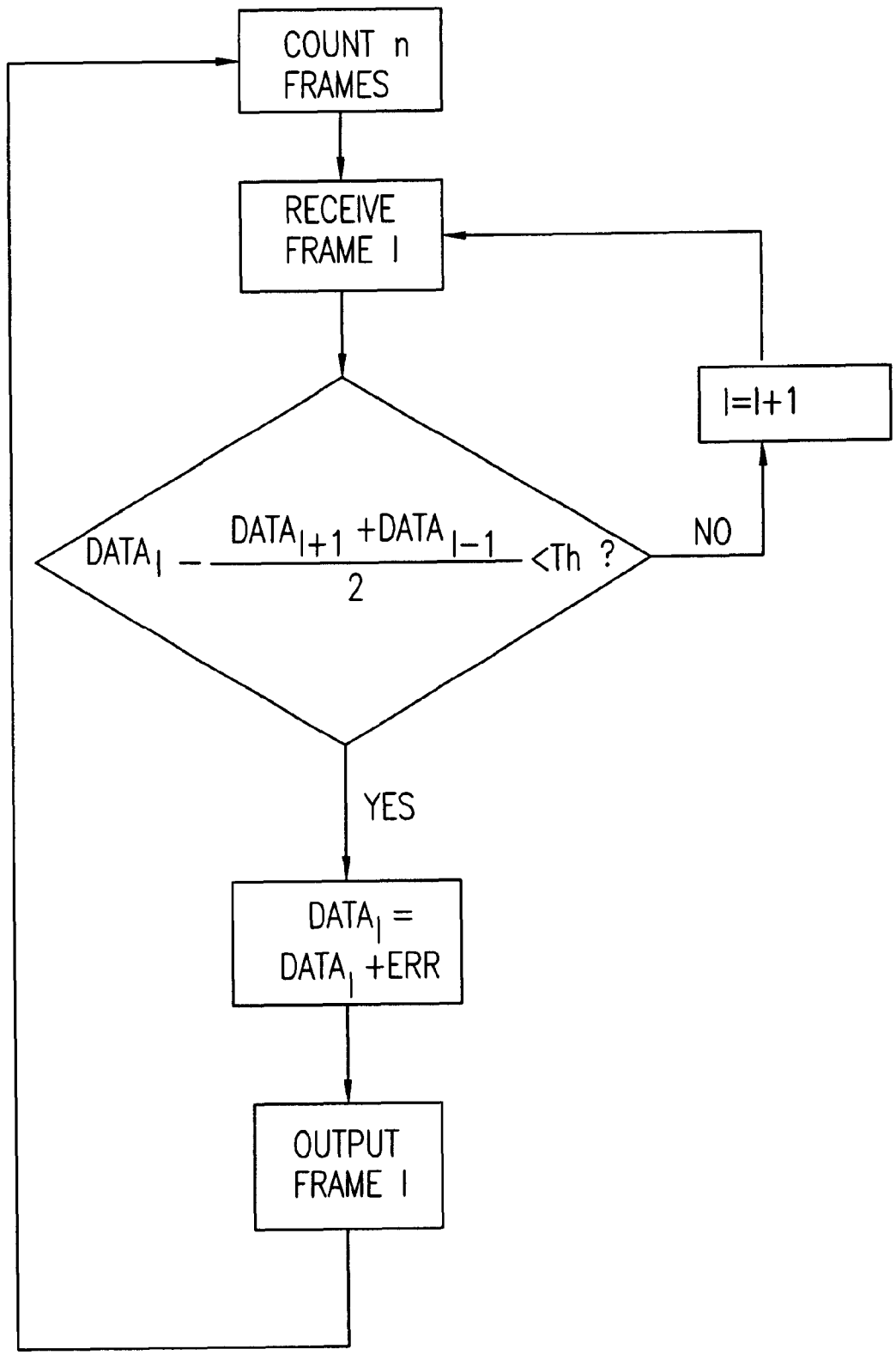
FIG. 5 is a flow chart that schematically illustrates a method for generating the sequence of data samples shown in FIG. 4, in accordance with a preferred embodiment of the present invention.

FIG. 5 is a flow chart that schematically illustrates a method for generating intentional errors, such as that represented by value 78, in accordance with a preferred embodiment of the present invention. The errors are preferably introduced in the data at intervals no greater than a predetermined minimum, for example, a number n frames apart. Most preferably, no more than one frame per block is corrupted. Errors may be introduced in this manner to the entire contents of disk 68 or, alternatively, only to selected portions thereof.

The data intended for writing to the CD master are scanned by error generator 62, preferably three blocks at a time. In each frame, data values are checked to determine how close they are to the neighboring data values. In the example shown in FIG. 5, this "closeness" criterion is determined by the difference between the current data value and an average of the preceding and succeeding values. If the difference is greater than a predetermined threshold, the current frame is output without any change in its data value. The threshold is preferably proportional to the instantaneous signal amplitude, as given by the following equation:

$$|\tfrac{1}{2}(S_{n-1}S_{n+1})-S_n| \geq tol.S_n$$

wherein the $S_i$ terms represent successive data values. The parameter "tol" represents a tolerance factor, which is typically in the range of 0.1% to 1%.

On the other hand, if the current data value is sufficiently close to its neighbors, so that the difference of the data values is less than the threshold, an error is introduced by artificially increasing or decreasing the data value in the current frame. Preferably, the tolerance factor is initially set to a relatively low level, but if no suitable data value is found for error introduction at this low level, the tolerance factor may be increased until a suitable value is found. Similarly, if the signal level remains low over an extended period—typically at least 70 dB below full scale over at least 26 ms—an error may be introduced. The CIRC data in segments 32 and 36 of the current frame are not changed, however. Therefore, when CD 68 is played back, the error introduced in value 78 and its concealment by processor 40 go substantially unnoticed by a listener.

Figure 6A:
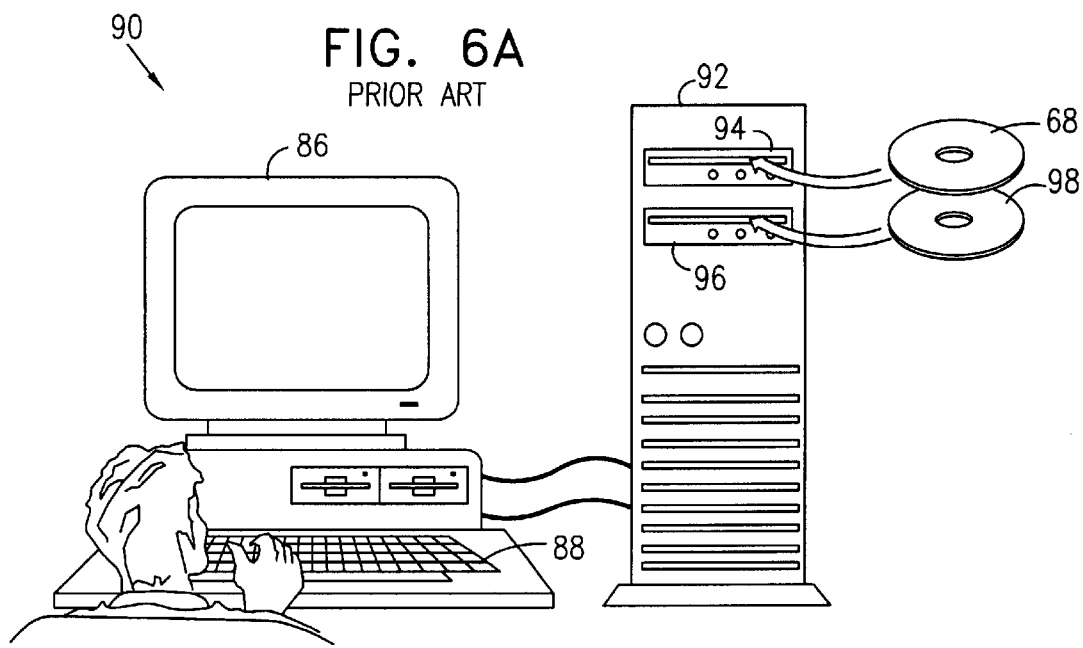
FIG. 6A is a schematic, pictorial illustration showing a system commonly used for making unauthorized copies of CDs.
Figure 6B:
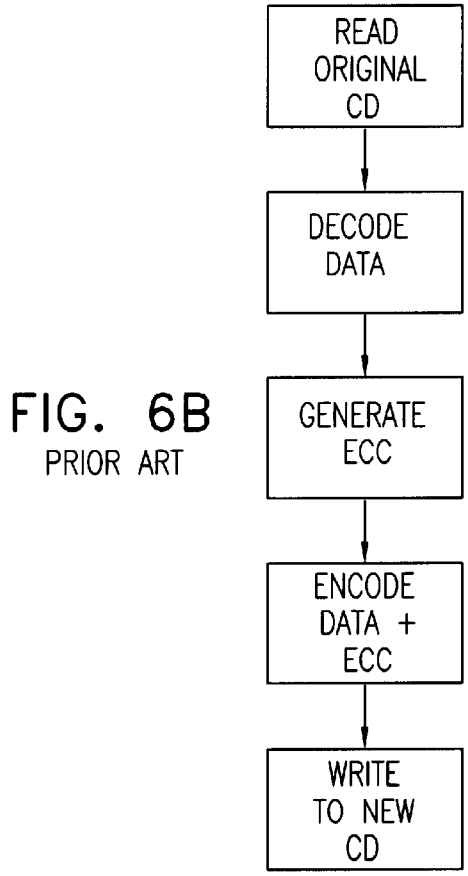
FIG. 6B is a flow chart that schematically illustrates a method implemented in the system of FIG. 6A for recording an unauthorized CD copy.

FIGS. 6A and 6B schematically illustrate a method commonly used in making an unauthorized copy of CD 68. Exposition of this method will be useful in understanding the effect of the errors introduced by error generator 66 in rendering the unauthorized copy unusable. FIG. 6A illustrates a system 90 used for this purpose, typically comprising a personal computer (PC) 92 having a CD-ROM drive 94, into which CD 68 is inserted, and a CD write drive 96, into which a blank CD 98 is inserted for copying of the contents of CD 68 thereto. Other elements of PC 92, such as RAM and hard disk, are not shown in the figure for simplicity of illustration. FIG. 6B is a flow chart illustrating the steps in the copying method.

Each frame of data read from CD 68 is decoded from fourteen- to eight-bit format and stored temporarily by PC 92. Only th e actual audio data values in segments 26 and 34 (FIG. 1) are read out and stored, however, and the CIRC values in segments 32 and 36 are discarded. In order to ensure that PC 92 will receive the audio data values without CIRC correction, error generator 66 (FIG. 3) manipulates the information recorded on CD 68 so that CD-ROM drive 94 identifies the audio track containing the data as a digital data track, instead of as an audio track. This manipulation may be accomplished in a number of ways, based on features of the IEC 908 standard:

By manipulating mode bits in the subcode Q channel of the track.

By manipulating mode bits in the table of contents (TOC) of the CD.

By introducing digital data on the CD either in other tracks or in pause and pregap areas of the audio track.

By writing CD 68 as a multi-session CD. An audio CD player will read only the first session, which is a standard audio session. CD-ROM drive 94, however, in conformance with the multi-session CD standard, will first read the last session in the TOC, in which the tracks of the first session are marked as digital.

Therefore, intentionally-erroneous data values introduced in CD 68, such as data value 78 (FIG. 4), are also stored in the PC memory, without indication that they are erroneous.

Prior to recording the stored data on CD 98 in standard audio CD format, new error correcting codes (CIRC) must be generated by CD drive 96. In this stage of code generation, there is no indication that data values such as value 78 are erroneous, and the corresponding codes are generated as though all data values were correct. The data (including the intentional errors and corresponding "correct" error codes) are re-encoded in fourteen-bit format and written to CD 98. Since the error correcting codes in the frame containing data value 78 now indicate that there is nothing wrong with this value, processor 40 (FIG. 2) will not flag the value as erroneous and will do nothing to conceal it. The playback of the unauthorized copy will therefore contain severe and unrecoverable audio distortions.

Although the method described hereinabove refers explicitly to audio data recorded on a CD, the method may also be adapted for protecting computer programs on CD-ROM from unauthorized copying. For this purpose, the CD-ROM should contain at least one audio track. A key, such as a password, which is necessary in order to run one or more of the programs on the CD-ROM, is encoded and stored in the form of audio data on the audio track, with one or more errors intentionally introduced therein. When the original CD is used, the errors are detected due to the discrepancy between the erroneous data and the corresponding CIRC data, and the correct key is returned in order to run the program. When an unauthorized copy is used, however, the CIRC data will have been recalculated, and the expected errors will not be detected. Failure to detect the errors causes an incorrect key to be returned, whereupon the program aborts.

Figure 7:
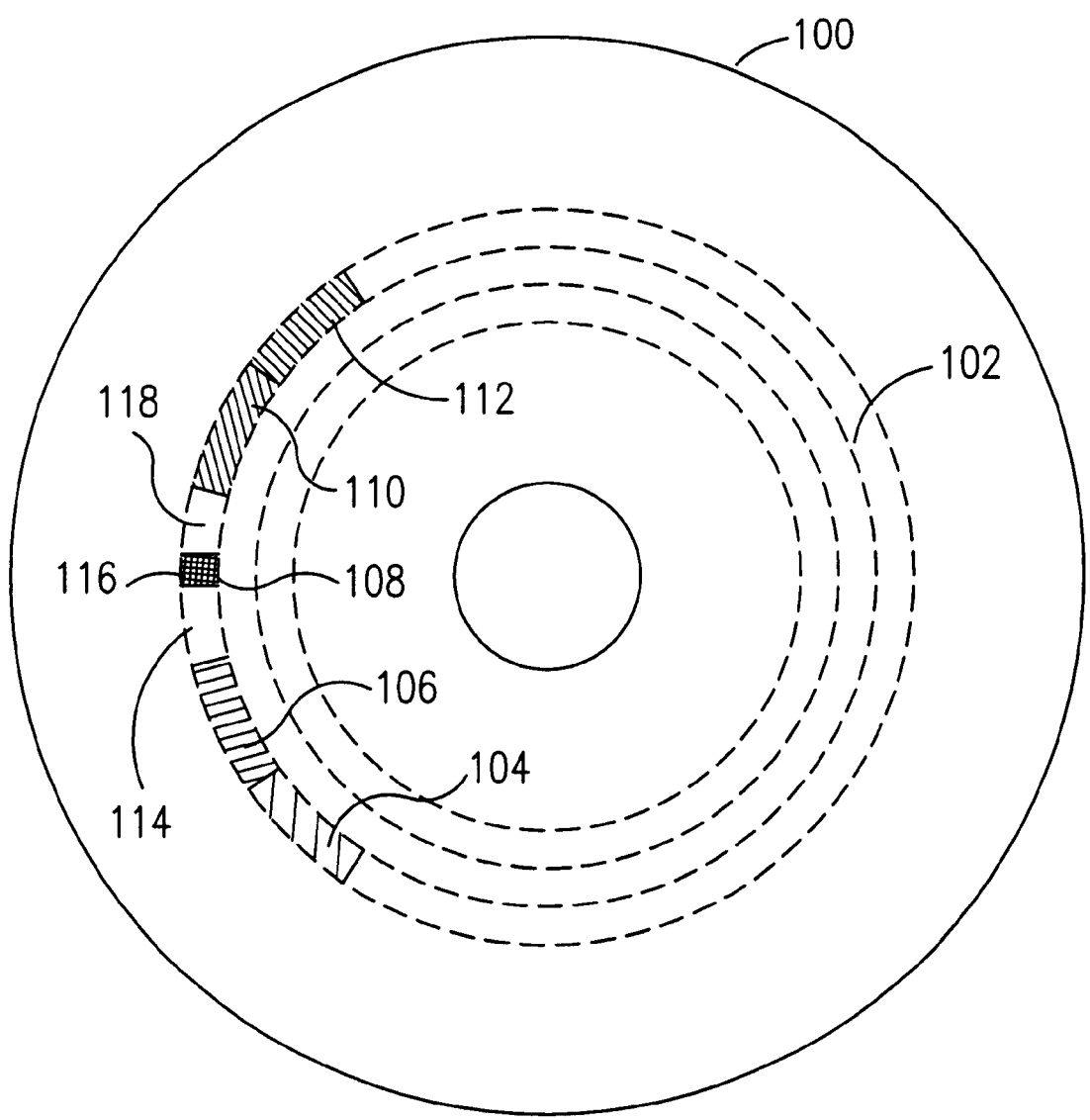
FIG. 7 is a schematic top view of a CD in which an erroneous segment has been created, in accordance with a preferred embodiment of the present invention.

FIG. 7 is a schematic top view of an original CD 100, in which an error of another type has been intentionally introduced for the purpose of preventing unauthorized copying, in accordance with a preferred embodiment of the present invention. CD 100 preferably includes at least one audio track 102, which comprises data blocks 104, 106, 108, 110 and 112 in predetermined positions thereon. The remaining tracks of the CD preferably include computer software and/or further audio data.

One of the data blocks, for example, block 108, includes an erroneous frame 116, along with frames 114 and 118, which preferably contain valid data. Frame 116 is such that when computer 92 (FIG. 6A) attempts to read block 108 using CD-ROM drive 94, a drive error is generated, indicating that an invalid block has been encountered and cannot be read by the computer. Preferably, frame 116 includes a run of data of length greater than $T_{max}$, i.e., greater than eleven bits long, in which there is no transition between the high and low data levels (1 to 0 or 0 to 1).

Figure 8:
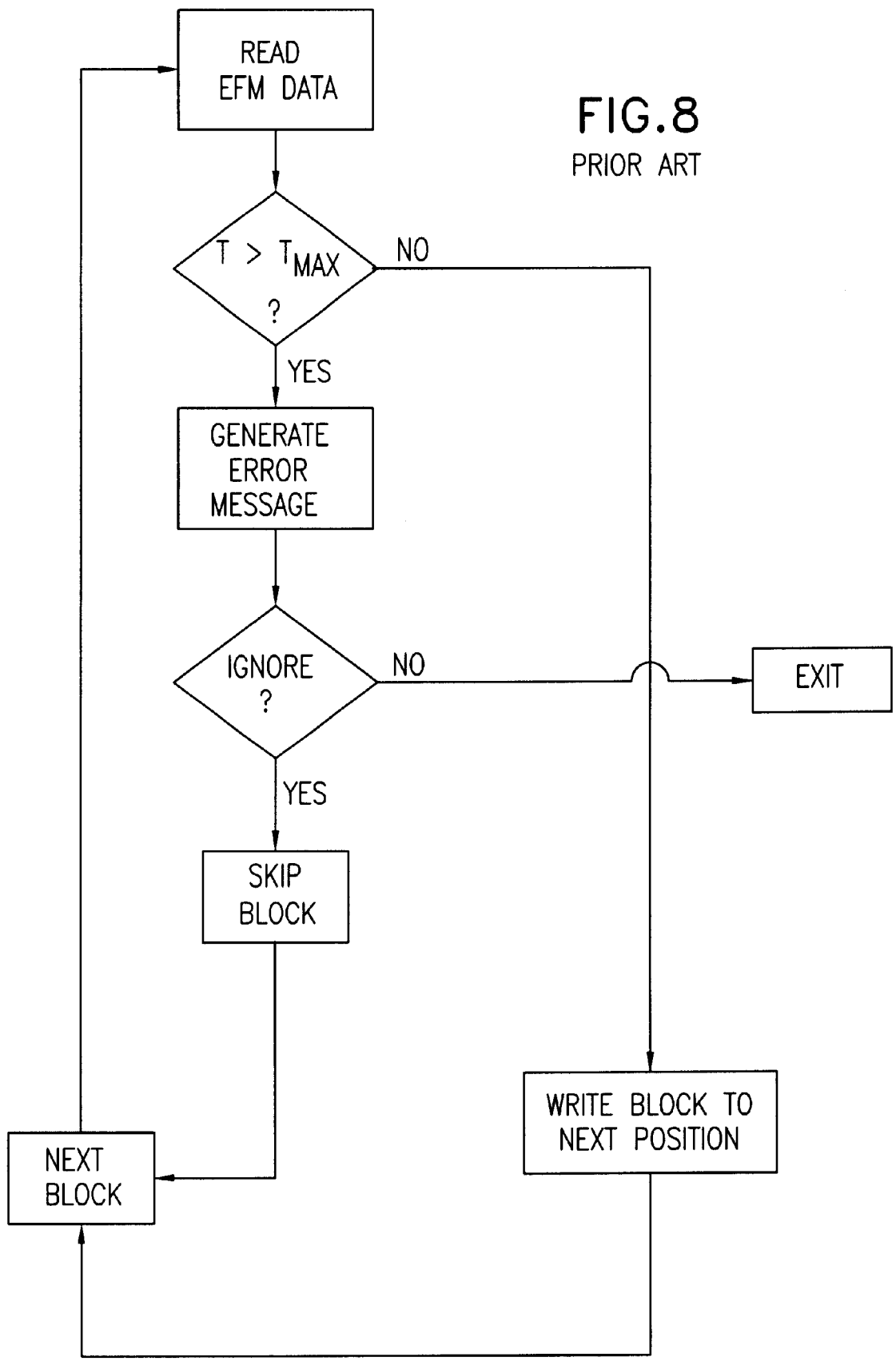
FIG. 8 is a flow chart that schematically illustrates steps taken by a computer that is used to record a pirate copy of the CD of FIG. 7.

FIG. 8 is a flow chart illustrating a method for producing an unauthorized copy of CD 100, making use, for example, of system 90 (FIG. 6A). CD 100 is inserted into drive 94, and the data recorded on the CD are normally read out block by block and written to blank CD 98 in drive 96. When the readout process reaches frame 116 in block 108, however, drive 94 determines that the length T of a run of data without a transition has exceeded $T_{max}$. The drive signals PC 92 that a medium-related error has occurred on CD 100, and that consequently, block 108 cannot be read. In common PC operating systems, an error message is generated on a monitor 86 of the PC, informing a user of the error and prompting to "Retry, abort or ignore," as is known in the art. Since a retry will encounter the same problem, and aborting ends the copying process, the only alternative available is to press "i" on a keyboard 88 of PC 92, so as to ignore the error.

Other methods may also be implemented by error generator 62, based on the IEC 908 standard, to prevent CD-ROM drive 94 from successfully reading a particular track on CD 100. For example, the start time of a leadout of the track, as specified in the TOC of CD 100, carried in the subcode Q channel, may be set to an erroneous value, such as a value soon after the start of the data in the track. Alternatively, a time signature in the subcode Q channel of the track may be manipulated, for example, by making the absolute time of the track start before the end of the track leadin, or making the time flow constant or backwards for the track. Implementation of these methods will be clear to those skilled in the art.

Figure 9:
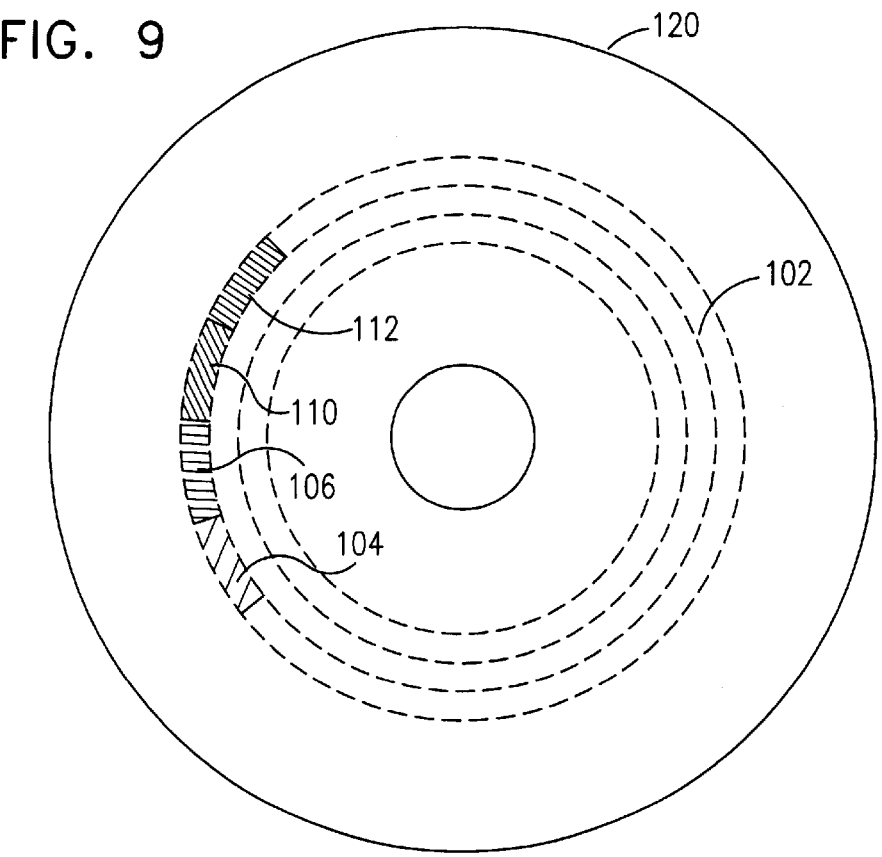
FIG. 9 is a schematic top view of a CD copy produced from the CD of FIG. 7, according to the steps illustrated in FIG. 8.

FIG. 9 is a schematic top view of a CD 120 on which an unauthorized copy of CD 100 is made, using the method of FIG. 8. When PC 92 is instructed to ignore the error in frame 116, it simply skips over block 108. As seen by comparing FIGS. 7 and 9, block 110 from original disk 100 is written to disk 120 immediately following block 106. Thus, on disk 120, block 110 is located in the position occupied by block 108 on original disk 100; block 112 is located in the original position of block 110; and similarly all subsequent blocks in track 102 are shifted relative to their original positions. All of the data that was originally in block 108 is lost in the copy.

Figure 10:
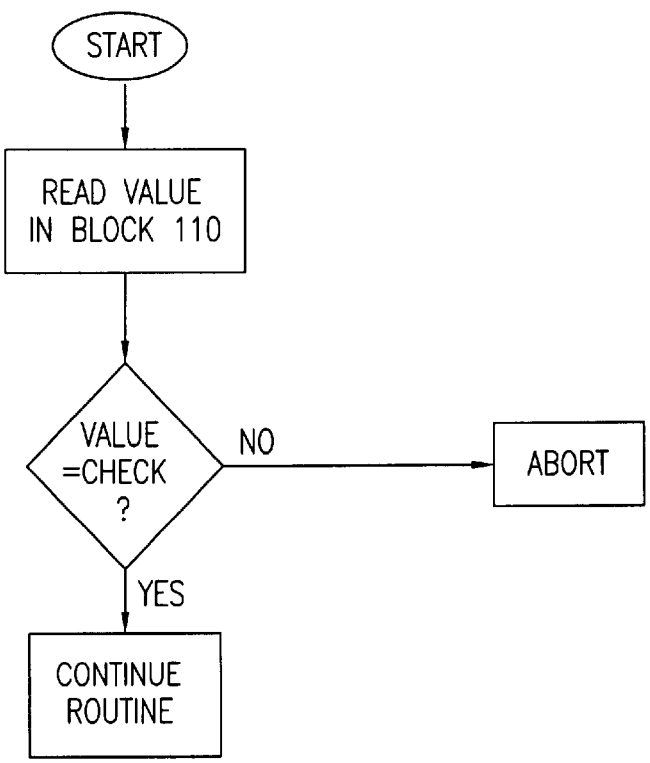
FIG. 10 is a flow chart that schematically illustrates a program routine associated with the CD of FIG. 7, in accordance with a preferred embodiment of the present invention.

FIG. 10 is a flow chart that schematically illustrates a program routine that is used to detect the block shift in unauthorized CD 120, relative to original CD 100, in order to prevent the use of software that was illegally copied onto CD 120, in accordance with a preferred embodiment of the present invention. The program routine is stored in any desired location on CD 100 or, alternatively or additionally, copied to the hard disk of a computer running the CD. The program routine may be called and used by any or all of the application programs stored on the CD.

The program routine of FIG. 10 instructs the computer to read a key or password in the form of data stored in the CD. The computer is instructed to read the data from a specified location on track 102, which is occupied by block 110 in original CD 100, and to compare the data value read from the location to a stored verification value. When original CD 100 is used, the data value is the correct one, stored in block 110, and the verification succeeds. When unauthorized CD 120 is used, however, block 112 is shifted to the position of block 110. Therefore, the data value read by the computer from the specified location is received from block 112, rather than block 110, and the verification fails. As a result, the program aborts, and the user is unable to run the software using the unauthorized CD copy.

The example illustrated in FIG. 10 and described hereinabove is a very simple one, for the sake of clarity of explanation. More complex coding schemes, including the used of multiple "erroneous" blocks, which are dropped in the unauthorized recording, and multiple audio tracks on the CD, may similarly be used. For example, a CD may include multiple audio tracks having the characteristics of track 102 (FIGS. 7 and 9), each of which tracks contains the key to a different program stored on the CD.

Figure 11:
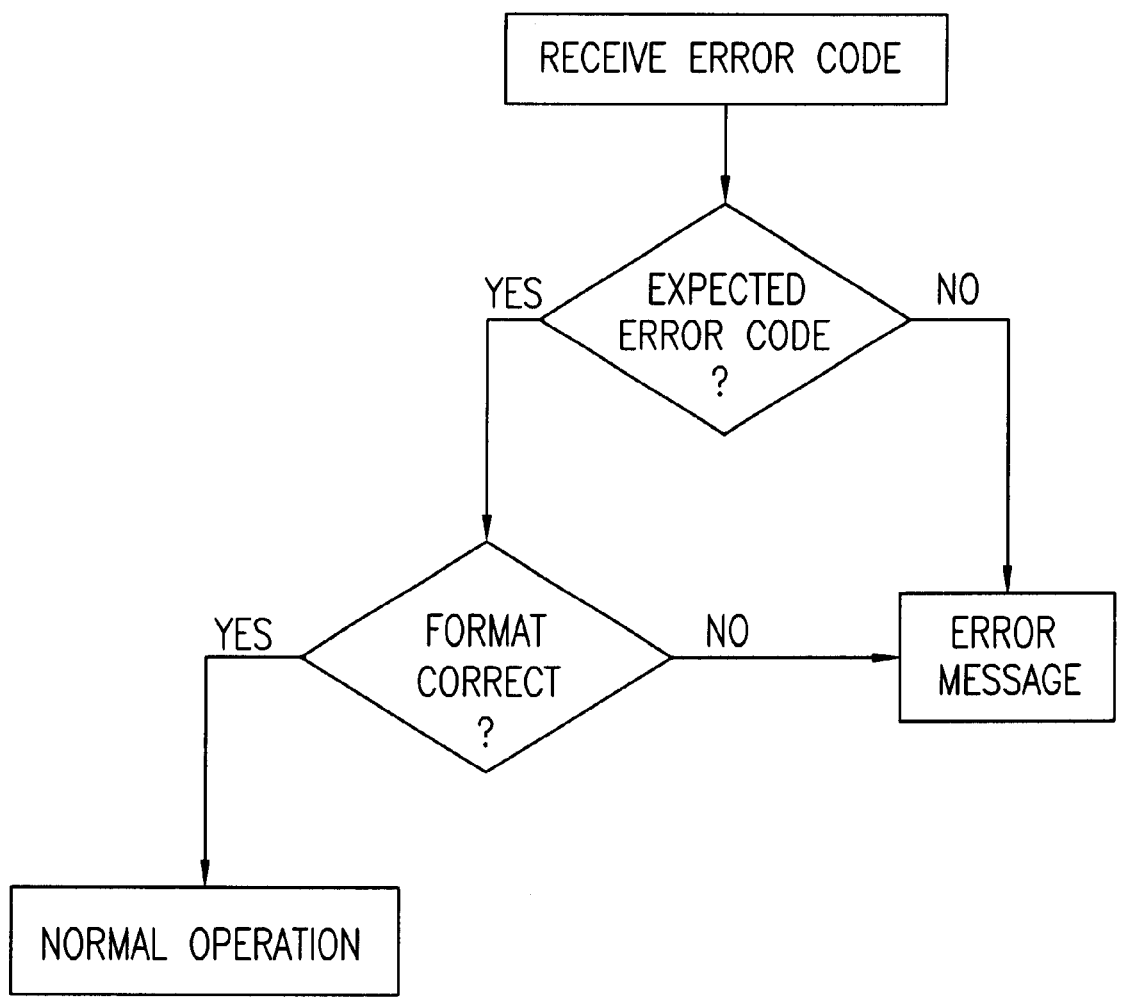
FIG. 11 is a flow chart that schematically illustrates a program routine associated with the CD of FIG. 7, in accordance with another preferred embodiment of the present invention.

FIG. 11 is a flow chart that schematically illustrates another program routine for distinguishing between original and unauthorized copy CDs, in accordance with a preferred embodiment of the present invention. This routine similarly makes use of erroneous frame 116, which causes block 108 to be dropped when unauthorized CD 120 is copied from original CD 100. Alternatively, it may occur that in place of block 108, unauthorized CD 120 includes another block with substitute data, which is inserted by the pirate copying equipment.

When block 108 is prepared for writing to CD 100, frame 116 is intentionally corrupted, as described hereinabove, but valid data are recorded in remaining frames 114 and 118 of block 108. A valid error correcting code is computed for block 108, although the method for computing the code is not entirely conventional, since there is an error in the block. For example, a block error code may be computed based on CIRC conventions, as provided generally by the IEC 908 standard, except that the code is computed only on the basis of the 97 valid frames in block 108, omitting frame 116. The normal run-time procedure used by a computer to handle error messages a from CD drive containing CD 100 is replaced by the routine represented by FIG. 11. Preferably, this routine is stored on CD 100 and is installed to the hard disk of the computer at the time of installation of the software on the CD.

When track 102 of CD 100 is read by the CD drive of the computer, an error code is generated at block 108. Before stopping execution and delivering an error message, the computer checks the error code to determine whether it has the value that would be expected based on the known error introduced in frame 116. If the code does not have the expected value, the computer concludes that this is a real error in the medium, rather than an intentionally-introduced one. An error message is then generated, and execution is halted. If the code has the expected value for block 108, however, the computer then checks the format of the data read out from the block. Assuming the format to be as expected, including valid frames 114 and 118 before and after frame 116, the computer makes use of the data that does exist in block 108, and then proceeds with normal program operation. On the other hand, if the data format is not as expected for block 108 (despite the error code being correct), the computer generates an error message and halts execution. The routine of FIG. 11 thus allows track 102 of CD 100 to be used, including the data stored in block 108, despite the error in the block.

On the other hand, in unauthorized copy CD 120, the data stored in block 108 are lost, either because the block was dropped or because substitute data were inserted, as described above. Preferably, in producing original CD 100, the program data are distributed on the disk such that block 108 contains vital data. The loss of this block in CD 120 renders the disk unusable.

Although preferred embodiments are described hereinabove with reference to compact disk (CD) media and recording standards, those skilled in the art will understand that the principles of the present invention may be applied to other computer data storage media, such as digital video disks (DVD) in particular, and to other recording standards. These principles may be adapted not only for audio data and software programs as described hereinabove, but also for other types of multimedia data, such as video and text. Furthermore, although in the described embodiments, certain specific types of data distortions and run-time errors are used, those skilled in the art will realize that other types of errors may also be introduced in original media for similar copy-prevention purposes. It will thus be appreciated that the preferred embodiments described above are cited by way of example, and the full scope of the invention is limited only by the claims.

What is claimed is:

1. A method for protecting data recorded on an original data storage medium against unauthorized copying, comprising:
   receiving data encoded in accordance with an applicable recording standard;
   altering a portion of the encoded data such that the altered data are identified as erroneous according to the standard; and
   recording the data on the medium, the recorded data including ancillary data which are used by a processor in an intended application of the medium to operate upon the altered portion of the data,
   wherein the ancillary data comprise error detection codes, and wherein altering the portion of the data comprises changing a data value without changing a corresponding error detection code, such that the value is identified as erroneous using the corresponding code, and
   wherein in the intended application using the original medium, the alteration of the portion of the data is concealed by interpolation based on the corresponding error detection code.

2. A method according to claim 1, wherein altering the data comprises selecting a portion of the data for alteration so as to minimize the effect on the application of substituting an interpolated value of the data for a received value thereof.

3. A method for protecting data recorded on an original data storage medium against unauthorized copying, comprising
   receiving data encoded in accordance with an applicable recording standard;
   altering a portion of the encoded data such that the altered data are identified as erroneous according to the standard; and
   recording the data on the medium, the recorded data including ancillary data which are used by a processor in an intended application of the medium to operate upon the altered portion of the data,
   wherein the ancillary data comprise error detection codes, and wherein altering the portion of the data comprises changing a data value without changing a corresponding error detection code, such that the value is identified as erroneous using the corresponding code, and
   wherein changing the data value comprises changing the value of a digital audio signal, such that when the ancillary data are not used to operate upon the altered portion, the quality of an audio output signal generated responsive to the data is noticeably degraded.

4. Apparatus for protecting data recorded on an original data storage medium against unauthorized copying, comprising an error generator, which receives data encoded in accordance with an applicable recording standard and alters a portion of the encoded data prior to recording of the data on the medium such that the altered data are identified as erroneous according to the standard, wherein the data recorded on the medium include ancillary data, which are used by a processor in an intended application of the medium to operate upon the altered portion of the data, and wherein the ancillary data comprise error detection codes, and wherein the error generator alters a data value in the encoded data without changing a corresponding error detection code, such that the value is identified as erroneous using the corresponding code, and wherein in the intended application using the original medium, the alteration of the portion of the data is concealed by interpolation based on the corresponding error detection code.

5. Apparatus according to claim 4, wherein the error generator selects a portion of the data for alteration so as to minimize the effect on the application of substituting an interpolated value of the data for a received value thereof.

6. Apparatus for protecting data recorded on an original data storage medium against unauthorized copying, comprising an error generator, which receives data encoded in accordance with an applicable recording standard and alters a portion of the encoded data prior to recording of the data on the medium such that the altered data are identified as erroneous according to the standard, wherein the data recorded on the medium include ancillary data, which are used by a processor in an intended application of the medium to operate upon the altered portion of the data, and wherein the ancillary data comprise error detection codes, and wherein the error generator alters a data value in the encoded data without changing a corresponding error detection code, such that the value is identified as erroneous using the corresponding code, and wherein the error generator changes the value of a digital audio signal, such that when the ancillary data are not used to operate upon the altered portion, the quality of an audio output signal generated responsive to the data is noticeably degraded.

7. A data storage medium that is resistant to unauthorized copying, on which medium data encoded in accordance with an applicable recording standard are stored, a portion of which encoded data is altered such that the altered data are identified as erroneous according to the standard, the stored data including ancillary data which are used by a processor in an intended application of the medium to operate upon the altered portion of the data, wherein the ancillary data comprise error detection codes, and wherein altering the portion of the data comprises changing a data value without changing a corresponding error detection code, such that the value is identified as erroneous using the corresponding code, and wherein in accordance with the standard, the error detection code is recalculated upon copying of the data, so that the altered portion is no longer identified as erroneous, and wherein in the intended application using the original medium, the alteration of the portion of the data is concealed by interpolation based on the corresponding error detection code.

8. A medium according to claim 7, wherein a portion of the data is selected for alteration so as to minimize the effect on the application of substituting an interpolated value of the data for a received value thereof.

9. A data storage medium that is resistant to unauthorized copying, on which medium data encoded in accordance with an applicable recording standard are stored, a portion of which encoded data is altered such that the altered data are identified as erroneous according to the standard, the stored data including ancillary data which are used by a processor in an intended application of the medium to operate upon the altered portion of the data, wherein the ancillary data comprise error detection codes, and wherein altering the portion of the data comprises changing a data value without changing a corresponding error detection code, such that the value is identified as erroneous using the corresponding code, and wherein changing the data value comprises changing the value of a digital audio signal, such that when the ancillary data are not used to operate upon the altered portion, the quality of an audio output signal generated responsive to the data is noticeably degraded.

* * * * *